United States Patent [19]

Gagnon et al.

[11] Patent Number: 4,600,085

[45] Date of Patent: Jul. 15, 1986

[54] PLATFORM LIFT

[76] Inventors: Pierre Gagnon, 5637 Wilderton Avenue, Montreal, Canada, H3T 1S1; Pierre LaForest, 1945 Bruxelles Street, Montreal, Canada, H1L 5Z5

[21] Appl. No.: 673,108

[22] Filed: Nov. 19, 1984

[51] Int. Cl.[4] .......................... B66B 1/00; B60S 13/00; B66F 7/12; A63J 1/02

[52] U.S. Cl. ...................................... 187/24; 187/8.59; 182/141; 254/89 R; 254/103; 272/22

[58] Field of Search .................. 187/8.59, 24, 25, 9 E; 182/141, 63; 254/7 R, 7 C, 47, 89 R, 103; 52/7, 118, 121; 272/21, 22

[56] References Cited

U.S. PATENT DOCUMENTS

| | | | |
|---|---|---|---|
| 2,576,389 | 11/1951 | Craighead | 52/121 |
| 3,399,887 | 9/1968 | Altier | 187/17 X |
| 3,414,086 | 12/1968 | Ulinski | 187/9 E |
| 3,851,854 | 12/1974 | Roybal | 254/7 C |
| 4,261,438 | 4/1981 | Olson | 187/9 E |
| 4,466,509 | 8/1984 | Kishi | 187/18 |

FOREIGN PATENT DOCUMENTS

| | | | |
|---|---|---|---|
| 1297930 | 11/1972 | United Kingdom | 187/8.59 |

*Primary Examiner*—Charles A. Marmor

*Assistant Examiner*—Gregory L. Huson

[57] ABSTRACT

A platform lift mechanism for theaters, concert halls, etc. The lift device is a module or modules formed of four segments telescopically, vertically extendable or retractable relative to each other, except for a fixed base segment. The platform is secured to the uppermost segment. The second segment carries a rotatable nut adapted to raise and lower an elongated complementary screw secured at its upper end to the third segment. When four modules are used, a synchronizing chain is provided to actuate all modules synchronously. A brake and a motor are provided, either for each module or for all of them. A motor control is also provided.

17 Claims, 8 Drawing Figures

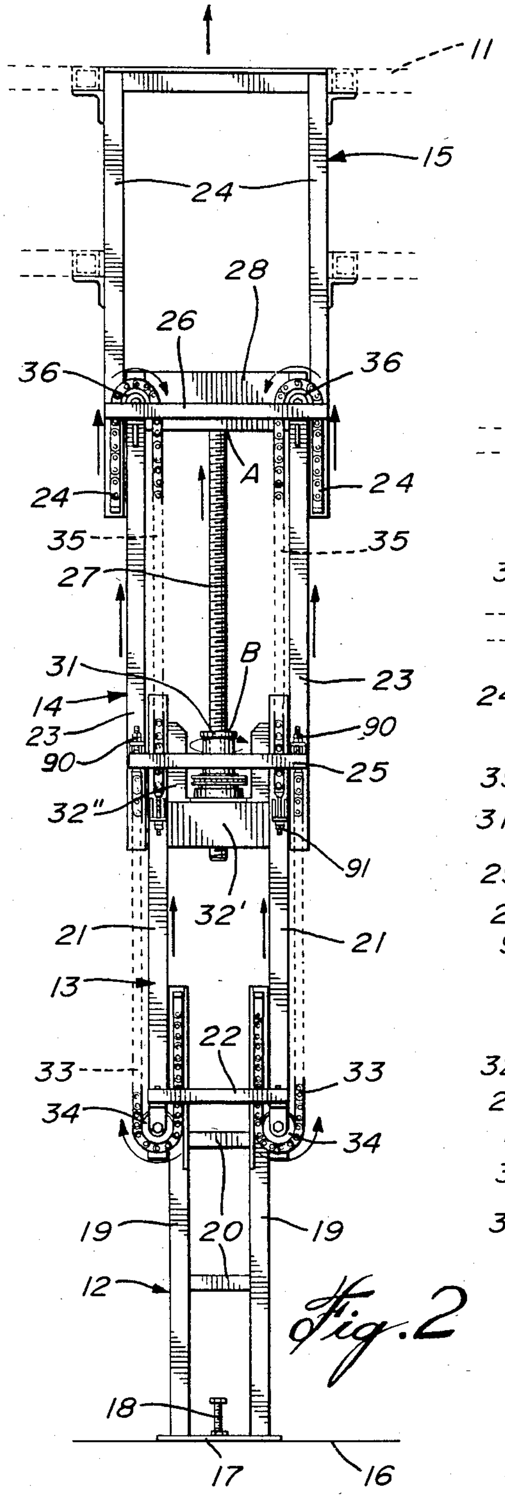
Fig. 2
Fig. 3
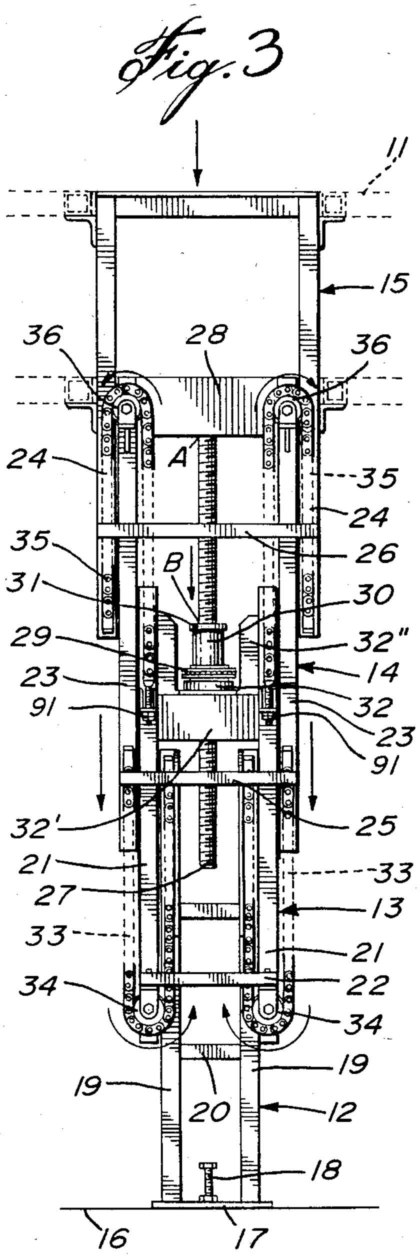

PLATFORM LIFT

FIELD OF THE INVENTION

The present invention relates generally to lift mechanisms, more particularly to a mechanism adapted to raise and lower a large structure such as a stage or orchestra platform in a precisely controlled manner.

BACKGROUND OF THE INVENTION

In theaters and concert halls it is frequently necessary to have a portion of the stage which can be raised or lowered for special scenic effects. In one known application, the front part of the stage is raised to increase the total area as needed, and lowered to accomodate, for example, an orchestra in the pit thereby made. If the stage is already large enough without the extra area of the movable portion the latter can remain in lowered position and extra seats for a performance may be added thereover.

U.S. Pat. No. 3,399,887 to W. Altier, dated Sept. 3, 1968 provides a stage lift consisting of conventional hydraulic rams which, because of their length, must be partially embedded in the ground; such rams are also difficult to control and synchronize.

OBJECTS OF THE INVENTION

Accordingly, it is an important object of the present invention to provide a lift for a stage portion of any size and wherein a plurality of lift mechanisms may be provided which are perfectly synchronized and which require minimum head room in lowered position.

It is another object of the present invention to provide a lift of the character described, which is provided with an automatic brake means in case of power failure.

SUMMARY OF THE INVENTION

The above and other objects and advantages of the present invention are realized according to a preferred embodiment comprising, in general, at least one lift module having a power means such as, preferably, a hydraulic motor.

The lift module is of novel construction. It includes and is formed of four distinct segments which are upright and telescopically slidable relative to one another in both vertical directions. The first segment functions as a base and is rigidly secured to the floor underneath the stage portion to be raised. The second segment is made to laterally straddle the first segment. A first lift means is provided to raise or lower the second segment relative to the base segment. Guide means to assure the smooth movement of the second segment are further provided. Similarly, the third segment straddles the second segment and the fourth segment straddles the third segment. The stage portion to be displaced is rigidly secured to the fourth or uppermost segment.

A second lift means is provided to raise and lower the fourth segment relative to the third segment. Guide means identical to the first-named guide means are provided between the fourth and third segments as well as between the third and second segments.

The first and second lift means constitute passive or solely responsive lift devices which are adapted to be actuated by a primary lift means. The latter consists of, firstly a large, vertical, elongated, threaded screw or shaft which has its upper end rigidly secured to the third segment. Its lower end is free and the length of the screw is slightly less than the overall height of each segment, which are all of the same height. The upper end portion of the second segment is formed with a nut support means to which is secured, by bearings, a nut which has a central, vertical and threaded bore adapted to threadedly engage the elongated screw. Thus, the nut is rotatable about the screw.

The power means is mechanically connected to this nut, being able to rotate the same ground the screw moving the latter to raise or lower the third segment relative to the second segment. As this movement occurs, the first and second lift means are actuated to extend or retract the other segments.

Although the invention as described functions with a single lift module, it is contemplated to use several lift modules in tandem, the number used depending on the size and weight of the platform to be lifted. To achieve synchronicity between the different modules, it is also contemplated to provide a bridge between at least two modules, preferably four, which bridge is provided with synchronizing means between all the modules second segments, so that the platform will rise smoothly. The whole system may be actuated by a single power means or by a power means for each module. The power means may be hydraulic motors.

Preferably, the hydraulic motors are regulated by a servo-valve to control the speed, acceleration and deceleration of the module segments.

Preferably also, a brake means is provided which will instantly stop movement of the modules in any position, should the power means fail, and which constitutes an additional safety feature to further assist the brake provided by the screw and nut system.

BRIEF DESCRIPTION OF THE DRAWINGS

The above will be more clearly understood by having referral to the preferred embodiment of the invention, illustrated by way of the accompanying drawings, in which:

FIG. 2 is a front elevation of one lift module in almost fully raised configuration;

FIG. 3 is another front elevation of one lift module in semi-lowered configuration;

Like numerals refer to like elements throughout the drawings.

DETAILED DESCRIPTION OF THE PREFERRED EMBODIMENT

Figure 1:
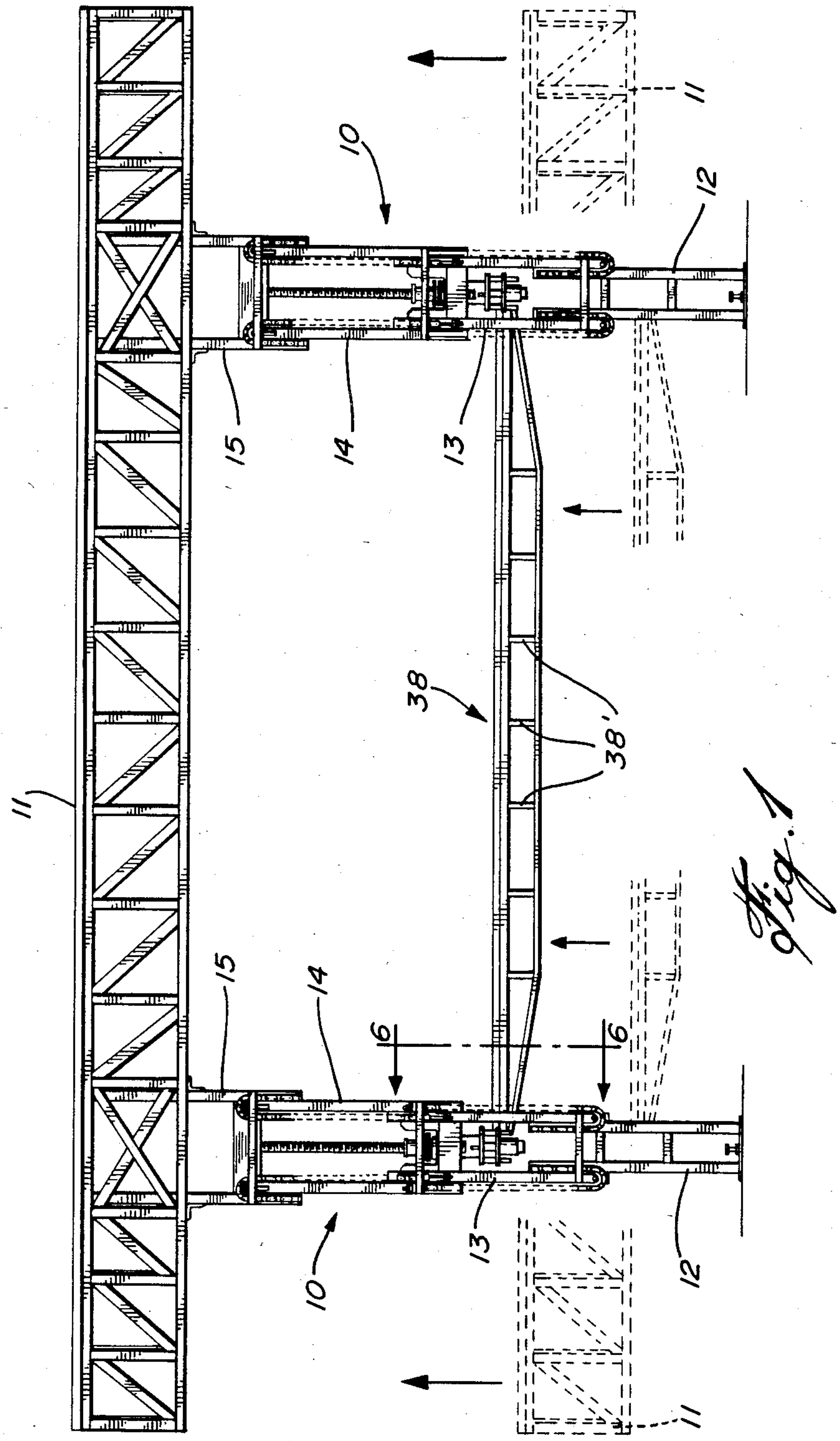
FIG. 1 is a front elevation of a platform and four lift modules (only two are visible) interconnected by a bridge, also showing in dashed outline the lower position of the platform and the bridge.
Figure 4:
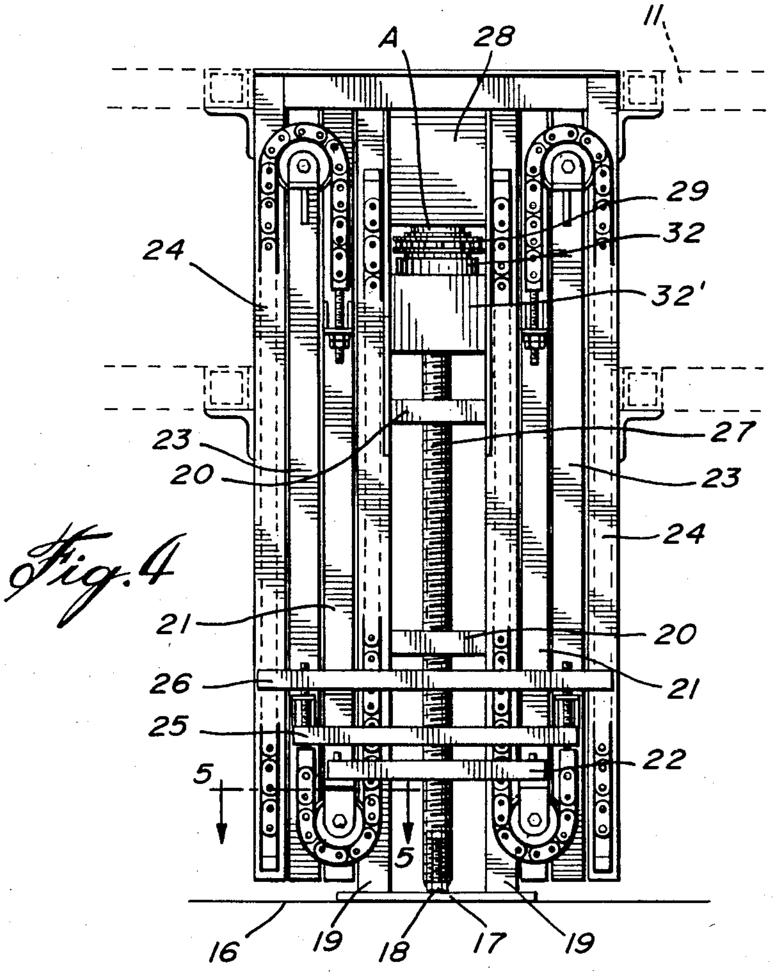
FIG. 4 is still another front elevation of one lift module in totally lowered configuration.

FIG. 1 illustrates a pair of lift modules generally indicated at 10 arranged to lift a fairly large platform such as a stage 11. As described herein, stage 11 is rectangular in shape, having a module 10 at each of its four corners.

Modules 10 are identical, one of which is illustrated in FIGS. 2–5. Each consists of four segments 12, 13, 14 and 15. Lower or base segment 12 is firmly anchored to a floor 16 by means of a plate 17 and bolt 18. It is formed of two longitudinally-spaced girders 19 rigidly joined by a pair of vertically-spaced cross-members 20.

Second segment 13 is also formed of two longitudinally spaced girders 21 joined adjacent their lower ends by another member 22. Girders 21 are more widely spaced than are girders 19 so that the former straddle the later exteriorly thereof. The nut support means and nut are seen at the upper portion of segment 13 and are described fully below.

Similarly, segments 14 and 15 are formed of spaced-apart girders 23 and 24 respectively, the latter successively straddling girders 21 and 23, respectively. Segment 14 has its girders 23 joined by a fourth cross-member 25 adjacent its lower end. Likewise, segment 15 is provided with a fifth cross-member 26 also adjacent its lower end. Girders 24 of segment 15 are rigidly secured to stage portion 11.

The primary lift means mentioned above includes an elongated vertical and exteriorly threaded screw 27, preferably a "saginaw" screw. Screw 27 is rigidly secured at its upper end to a fixed retaining member 28 and extends centrally between the various girders of the different segments. Its lower end is free.

A nut 29 having a vertical internally threaded bore complementary to the threading of screw 27 is mounted in a nut support means consisting of a housing 30, a housing cap 31 and a housing support plate 32. Nut 29 is rotatably mounted in its housing 30 by means of bearings (not shown). A pair of spaced-apart vertical plate members 32' are rigidly fastened to the underside of housing support plate 32 and depend therefrom. Both plates 32' are also rigidly secured to girders 21 of second segment 13. As an added strengthening feature, plate members 32' are formed with upwardly projecting rigid arms 32".

The base of nut 29 receives screw 27. Since nut 29 is attached to segment 13 by way of its fixed housing 30, rotating nut 29 will cause the different segments, except segment 12, to move up or down, as explained below. The circumference of nut 29 is formed with teeth 29' (only seen in FIG. 7) around which is entrained the transmission means of the power source.

The first lift means is embodied by a pair of flexible tie members or chains 33 each having one end attached to the upper end of one girder 19, passing around a sprocket wheel 34 mounted at each lower end of segment 13, then extending upwardly, being fixed at its opposite end to the lower end of each girder 23 of third segment 14. Chains 33 are of a predetermined length.

The second lift means is similar, being embodied by a second pair of flexible tie members 35 each having one end secured to the lower end of its respective girder 24, then passing around another sprocket wheel 36 mounted at the upper end of segment 14. Each tie member 35 further extends downwardly from its sprocket wheel 36 and is fixed at its opposite end to the upper end of its associated girder 21 of second segment 13. Chains 35 are also of a fixed length.

Both of the mentioned opposite ends of chains 33, 35 include a tensioning device 90, 91 respectively.

A module 10 is adapted to raise and lower stage platform 11 in the following manner: firstly the power means is activated to set the transmission means in motion. Nut 29 will thus be made to rotate by its teeth 29' around screw 27. Taking FIG. 4 as a starting example, a module 10 is shown in fully collapsed position. The free lower end of screw 27 reaches almost to floor 16. As nut 29 begins to rotate it will cause screw 27 to begin an upward motion thus raising third segment 14 since screw 27 is rigidly secured to member 28 of segment 14. Secondly, and referring to FIG. 2, it will be clear that the distance between member 28 and nut 29 (point A and point B) progressively increases as segment 14 rises. Thirdly, this will cause the chains 33 of the first lift means to raise the second segment 13 because chains 33 are anchored to the lower end of rising third segment 14 and are of a fixed length. As shown, chains 33 follow the direction of the arrows. Fourthly, similarly, chains 35 of the second lift means raise fourth segment 15 along with stage 11, the sprocket wheels 36 rotating in the direction of the arrows.

To lower a fully raised stage 11, the power source is reversed to rotate nut 29 in the opposite direction as shown in FIG. 3.

Figure 5:
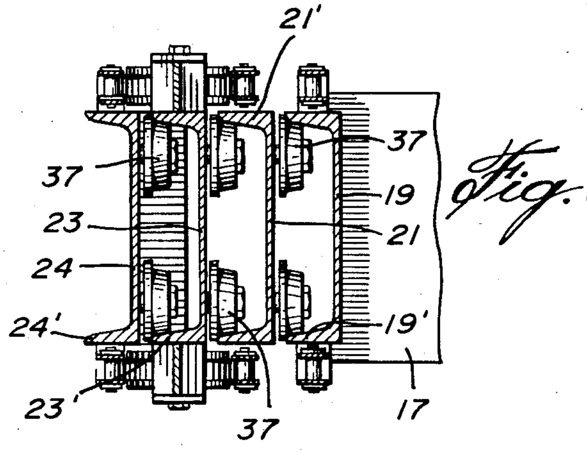
FIG. 5 is a cross-sectional view taken along line 5—5 of FIG. 4.

Referring now to FIG. 5, the guide means for the different segments is illustrated. Girders 19, 21, 23, 24 all have an identical cross-sectional profile, being formed with outwardly laterally projecting flanges 19', 21', 23', 24' at both their opposite ends. The inner surface of each girder, at both corners thereof, is provided with an axially longitudinal, inwardly projecting guide wheel 37 each designed to engage the corresponding inner surface of a lateral flange. Thus, as the girders move telescopically and vertically relative to each other, they are precisely guided by wheels 37 such that a smooth movement is achieved.

Figure 6:
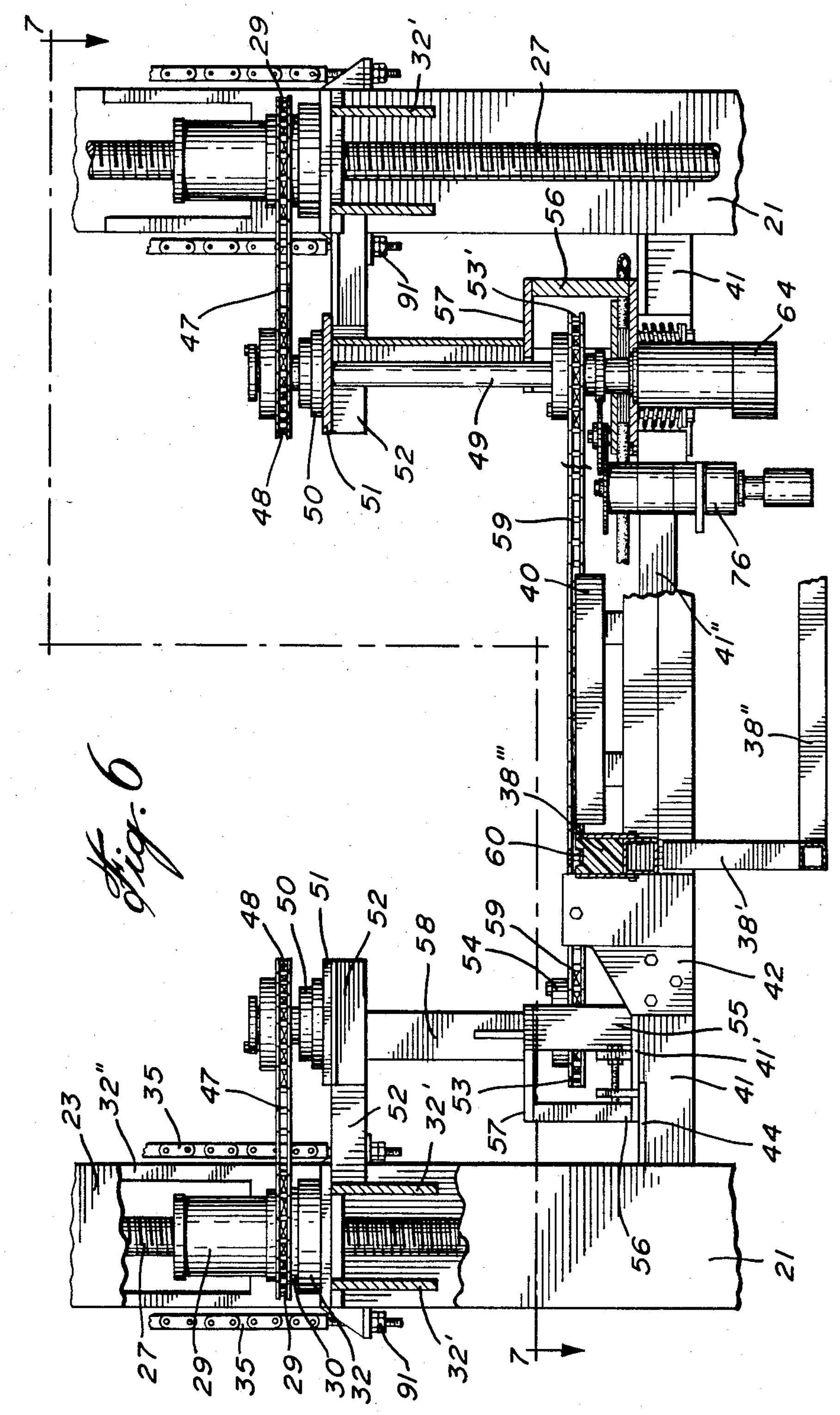
FIG. 6 is a cross-sectional view taken along line 6—6 of FIG. 1 and also along lines 6—6 of FIG. 7.
Figure 7:
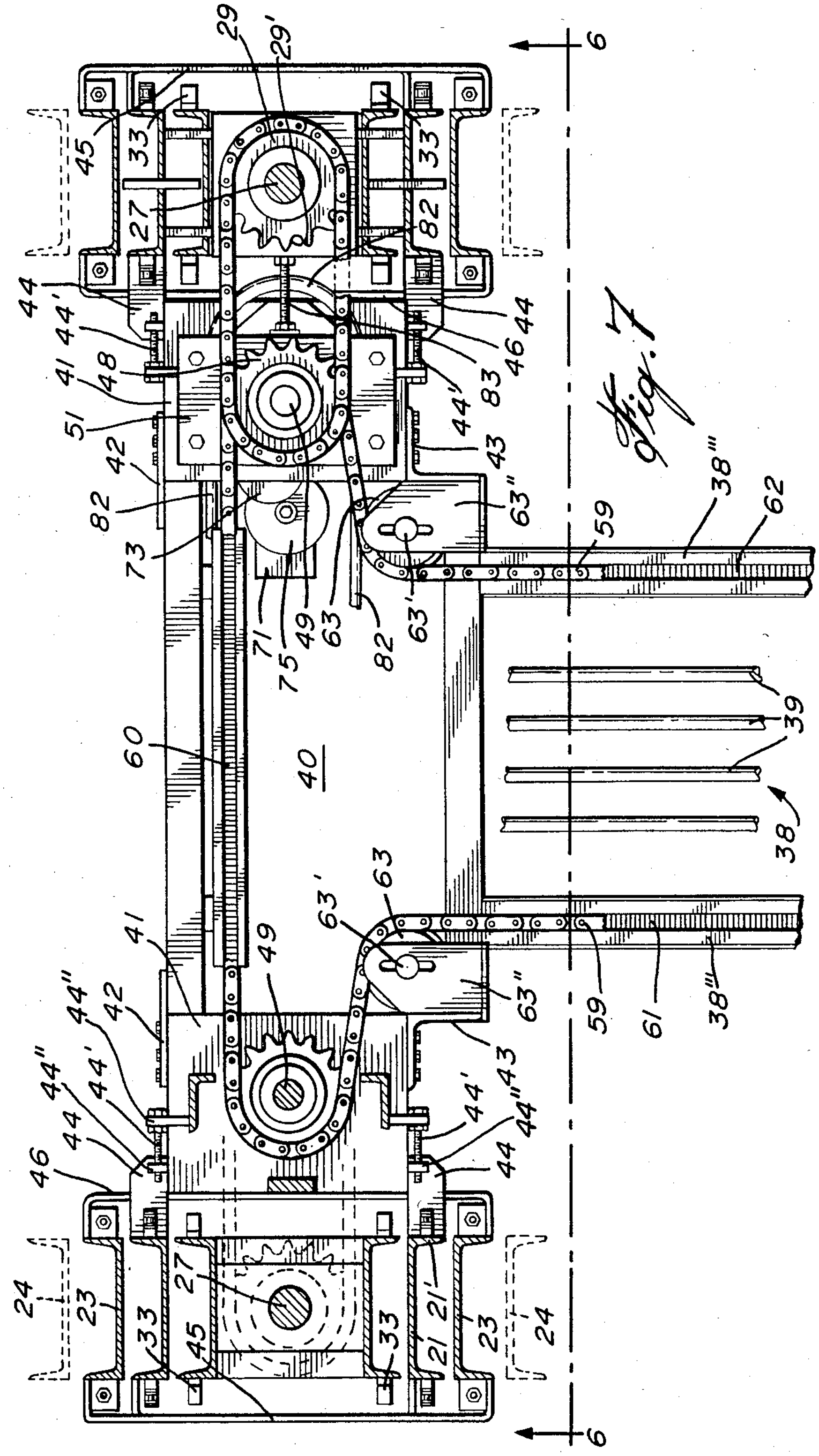
FIG. 7 is another cross-sectional view taken along lines 7—7 of FIG. 6.

By referring to FIGS. 1, 6 and 7, it will be more clearly perceived how the four rectangularly-disposed modules 10 are interconnected by the transmission means. The various elements embodying the transmission means are as follows: a longitudinally-extending bridge 38 situated centrally between each pair of laterally-aligned modules 10. Bridge 38 preferably includes a plurality of spaced-apart and reinforcing vertical struts 38', a plurality of elongated lower rods 39, as well as end reinforcing beams 38". Both ends of bridge 38 are rigidly secured to large flat plates 40 which are relatively thick. The outer sides of each plate 40 are further rigidly attached to a pair of generally flat and rectangular support members 41 by way of brackets 42 and 43 (best shown in FIG. 7). Referring specifically to the left portion of FIG. 7, one member 41 is shown as having a pair of laterally-spaced horizontal flanges 44 which are rigidly secured to the inner flange 21' of girder 21 of second segment 13. This provides extra strength to the transmission means. Also shown in FIG. 7 are a pair of protective cover plates 45, 46 secured to the girders of third segment 14, plate 46 having an appropriate slot for the transmission means when the modules are fully lowered. Both plates 45, 46 are of a height equal to the height of the individual segment.

The transmission means further includes an assembly adapted to transmit rotational power to each nut 29, consisting of a first endless chain 47 trained around its associated nut 29 and around a transmission sprocket 48. The latter is axially fixed to a drive extension shaft 49 for bodily rotation therewith. As shown, sprocket 48 is located at the upper end of shaft 49 and shaft 49 is journalled in a bearing 50 slidably carried by a bearing support plate 51. This bearing is mounted at one end of second support member 52 which is rigidly secured at its outer opposite end to one of the vertical plate members 32' and hence to housing 30 as well as second segment 13.

The lower end of drive extension shaft 49 carries another, second sprocket 53 and is journalled in a bearing 54. Sprocket 53 is located between a pair of spaced-apart L-shape members 55 and inwardly of a short standard 56, members 55 and standard 56 supporting a roof plate 57. Shaft 49 extends within a cylindrical sleeve 58.

A second power chain 59 extends around each sprocket 53 of each module 10 and is driven by the power source. Chain 59 is endless and moves in a chain guide track 60 formed in each flat plate 40 and also in two laterallyspaced guide tracks 61, 62 on either side of bridge 38. To render the production of bridge 38 more feasible the two upper beams 38''' may be made of a suitable solid plastic contained in a metal casing as shown in FIG. 6.

It will be apparent from the foregoing that second power chain 59 effectively and simultaneously transmits power to the second segment 13 of all the modules 10 connected together, enabling the latter to move up or down in a synchronized manner.

It is to be noted that provision is made to tension chains 47 and 59, should they begin to slacken after some use. The tensioning means consists firstly of a threaded screw 44' threadedly engaged in two blocks 44''. One of the blocks is fixed to flange 44. The other block is secured to a slidable plate 41', slidable either to the left or right as shown in FIG. 6. Extension shaft 49, bearing 50 and sprocket 48 are mounted on bearing support plate 51 which is similarly slidable. Plates 41' support the whole lower assembly 55, 56 and 57 and sprocket 53. There is one threaded screw 44' on either side of each sprocket 53 and each plate 41' is in turn mounted on a central transverse beam 41'', such that it can be displaced relative to the latter. A second pair of threaded screws 83 are threadedly engaged in each nut support plate 51 at their opposite ends. Thus, the entire transmission assembly can be adjustably transversely shifted to tension chains 47 and 59 as needed.

Secondly, an auxiliary sprocket gear 63 is slidably adjustably mounted between flat plate 40 and an overlying slotted plate 63''. There is one such gear 63 at the two corners facing bridge 38 of each flat plate 40. The chain tension is adjusted by simply repositioning each sprocket 63 in the slot of plate 63'', then tightening an axial bolt 63'.

Figure 8:
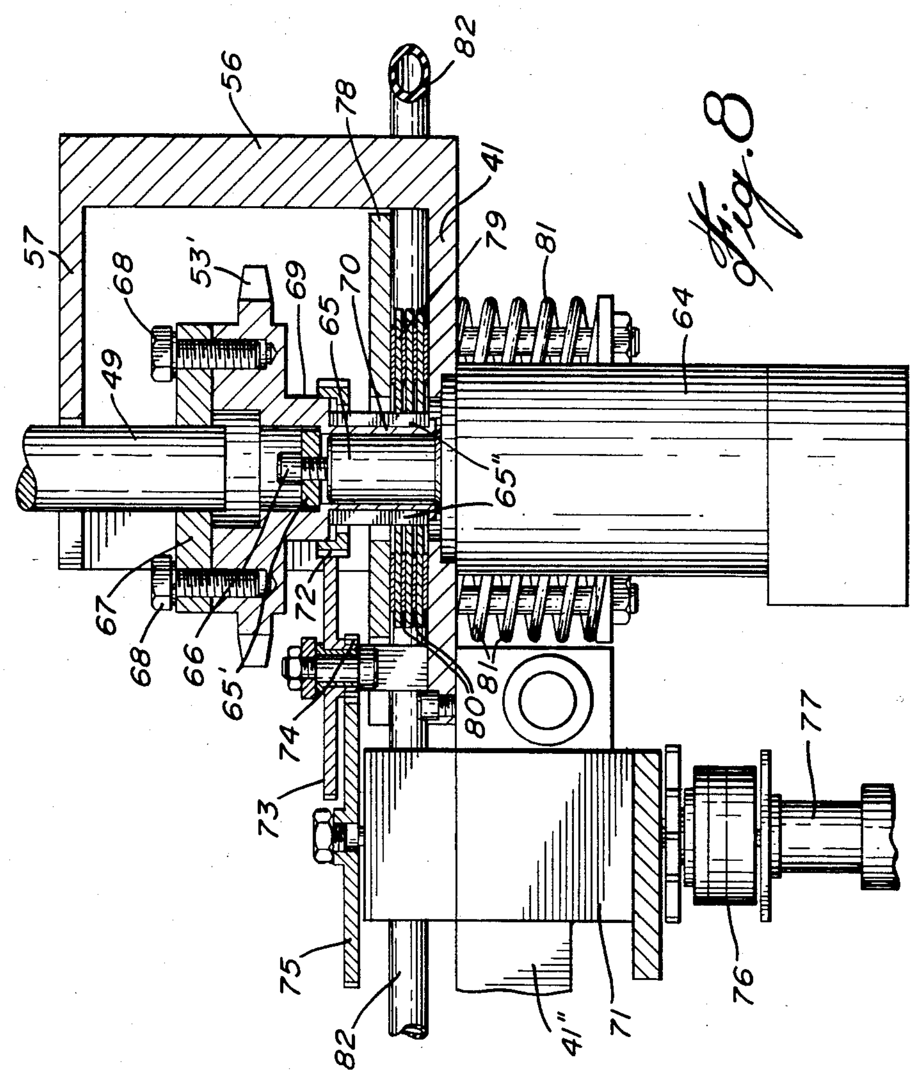
FIG. 8 is an enlarged detail, partially in crosssection, of the brake and power means seen at the right side of FIG. 6.

Referring to FIGS. 6-8, the power and brake means are advantageously shown.

The power means includes a hydraulic motor 64 mounted underneath rectangular support member 41 and having an upwardly-projecting drive or power shaft 65. The latter is axially connected to one extension shaft 49 by means of a cap screw 66 and spacer 65'. Similarly to the element described above, the lower end of shaft 49 has mounted thereon another modified sprocket 53' adapted to drive second power chain 59. Sprocket 53' has an annular member 67 secured by bolts 68. The lower portion of sprocket 53' is formed with an annulus 69 of small diameter and a downwardly extending sleeve 70 having an inner diameter corresponding to the diameter of power shaft 65 and which is rigidly secured to the latter. Thus, hydraulic motor 64 is adapted to move all modules 10 through power chain 59 and sprocket 53'.

Preferably, the power means is also provided with an automatic acceleration, deceleration and speed control means. This is embodied by a servo valve 71. Valve 71 is of the two spool type having two differential inputs and includes a potentiometer 76. The first input is achieved by a series of demultiplication gears 72, 73, 74 and 75 powered by motor 64. The second comparison input is an electric motor 77. Valve 71 is of course hydraulically connected to motor 64 by hydraulic lines (not shown) to regulate motor 64.

In FIG. 8 is also depicted the brake means, which means is essentially the same as disclosed in U.S. Pat. No. 4,271,934 issued June 9, 1981 in the name of Gagnon et al. The brake is comprised of: rectangular support plate member 41, a brake back plate 78, a plurality of stator disk plates 79 interposed between member 41 and back plate 78, a corresponding plurality of rotor disk plates 80 alternatingly sandwiched between stator plates 79 and a pair of helical compression springs 81 biasing member 41 towards back plate 78. Stator plates 79 are immobilized in any suitable known manner. Rotor plates 80 are rigidly secured to output shaft 65 by keys 65''. The assembly is completed by a flexible hydraulic conduit 82 extending in a loop between member 41 and back plate 78. Conduit 82 is made of flexible material and is fed by the hydraulic fluid pressure source (not shown).

When motor 64 is switched on the fluid will thus flow through conduit 82 thereby expanding it to its normal cylindrical shape.

Such expansion of conduit 82 will separate back plate 78 from member 41 thereby allowing power shaft 65 to rotate. Should the hydraulic fluid pressure source fail for any reason conduit 82 will instantly collapse, bringing rotor plates 80 into strong frictional contact with stator plates 79, aided by the biasing action of compression springs 81. Thus, motor 64 will be almost instantly stopped.

As an alternative, a hydraulic motor 64 can be associated with each module 10, in which case the power chain 59 is now used solely as a synchronizing chain with much less strain on said chain.

A motor 64 for each module 10 would be connected to sprocket 48 through a shaft 49, as shown at the right-hand side of FIG. 6. Servo-valve 71 would then be common to and control all the motors 64.

As a further modification, hydraulic motor, or motors 64, can obviously be replaced by electric motors.

What we claim is:

1. A platform lift comprising at least one module; said module being formed of four distinct, upright segments, including a first segment adapted to be secured to a supporting surface, a second segment telescopically, vertically slidable relative to said first segment; a third segment similarly telescopically slidable relative to said second segment, and a fourth segment similarly telescopically sildable relative to said third segment; said second segment laterally straddling said first segment and said third segment laterally straddling said second segment, and said fourth segment laterally straddling said third segment; a primary lift means secured to said second and said third segments and adapted to raise and lower said third segment relative to said second segment; a first passive lift means adapted to vertically displace said second segment relative to said first segment and, a second passive lift means adapted to vertically displace said fourth segment relative to said third segment as said primary lift means is actuated; guide means between said first and second segments, between said second and third segments, and between said third and said fourth segments; power means to operate said primary lift means, and a transmission means mechanically connecting the latter to the power means; the upper portion of said fourth segment adapted to be secured to the underside of a platform to be lifted.

2. A platform lift as defined in claim 1, wherein each of said segments is formed of a pair of spaced girders; each said girder having an outwardly, laterally projecting flange at both its opposite ends; said girders of said first segment being joined by a pair of vertically-spaced crossmembers; said girders of said second segment being joined adjacent their lower ends by another crossmember; the lower portions of said girders of said third segment being joined by a fourth cross-member; the lower portions of said fourth segment girders being likewise joined by a fifth cross-member; the upper ends of said girders of said third segment being joined by a rigid retaining member.

3. A platform lift as defined in claim 2, wherein said primary lift means comprises: an elongated externally threaded vertical screw rigidly secured at its upper end to said retaining member and having a free lower end; a nut rotatably mounted in a nut support means which is rigidly secured to the upper portion of said second segment; said nut having a central internally threaded bore complementary to the threading of said screw; said screw being threadedly engaged in said bore; said nut being mechanically connected to said transmission means.

4. A platform lift as defined in claim 3, wherein said first passive lift means consists of a pair of flexible tie members of the same predetermined length, each having one end attached to the upper end of one first segment girder, each passing around a sprocket rotatably mounted at the lower end of each second segment girder, and fixed at its opposite end to the lower end of each third segment girder.

5. A platform lift as defined in claim 4, wherein said second passive lift means consists of a second pair of flexible tie members, each having one end secured to the lower end of one fourth segment girder; each passing around another sprocket rotatably mounted at the upper end of each said third segment girder; each having its opposite end secured to the upper end of each second segment girder.

6. A platform lift as defined in claim 5, wherein said guide means comprises: a plurality of axially, longitudinal, inwardly-projecting guide wheels, one at each inner surface corner of said girders adjacent the lower end of each said segment; each said guide wheel being arranged to rollingly engage the corresponding inner surface of said flange.

7. A platform lift as defined in claim 6, wherein the circumference of said nut is formed with teeth; said transmission means being a first endless chain entrained around said teeth; said power means being a motor having an output shaft drivingly connected to said endless chain.

8. A platform lift as defined in claim 7, wherein there are four modules laterally aligned in pairs, one at each corner of said platform.

9. A platform lift as defined in claim 8, wherein said transmission means comprises: a rigid longitudinally-extending bridge located centrally between each pair of laterally-aligned modules; a flat plate secured to each of the opposite ends of said bridge; a pair of flat and rectangular first support members secured to the longitudinal side of each said flat plate and transversely thereto; the outer longitudinal side of each said first support member being secured to the adjacent said second segment; a synchronizing second endless chain supported and guided by said support member and drivingly connected to each of said nuts; said bridge being provided with a pair of longitudinally-spaced chain guide tracks for said synchronizing chain, the latter causing all of said modules to be extended and retracted in a synchronized manner.

10. A platform lift as defined in claim 9, wherein said transmission means further includes a second support member for each of said modules; each of the second support members being rigidly secured to said nut support means and extending laterally over its corresponding first support member; a drive extension shaft journalled at its lower and upper ends in each of said first and second support members, respectively; each said drive extendsion shaft carrying a first sprocket at its lower portion and a second sprocket at its upper end; said first endless chain extending around its associated said nut and also around its associated said sprocket; each said first sprocket meshing with said synchronizing endless chain; said power means including a motor having an output shaft connected to one of said drive extension shaft s.

11. A platform lift as defined in claim 10, wherein said transmission means further comprises a main chain tensioning means and an auxiliarly chain-tensioning means.

12. A platform lift as defined in claim 11, wherein said main chain-tensioning means comprises a slidably adjustable plate mounted on each said first support member; a pair of central transverse beams, each rigidly secured at its opposite ends to one of said adjustable plates; the four said adjustable plates each haivng journalled therein one of said first sprockets; said motor being mounted on one of said beams, a laterally-slidable bearing support plate mounted on each of said second support members; each said second sprocket having a bearing carried by a said bearing support plate; whereby each pair of laterally-aligned first and second sprockets, their respective said drive extension shafts and said motor can be laterally adjusted to properly tension said first and said second endless chains; means to adjustably lock each said adjustable plate.

13. A platform lift as defined in claim 12, wherein said auxiliary chain-tensioning means includes an auxiliary sprocket gear mounted in each of the two corners facing said bridge of each said flat plate; each said auxiliary sprocket gear meshing with said synchronizing chain and mounted over said flat plate and in a longitudinally-slotted overlying plate, whereby the position of each said auxiliary sprocket gear is secured by tightening an axial bolt.

14. A platform lift as defined in claim 12, wherein said motor is a hydraulic motor provided with an automatic acceleration, deceleration and speed control means.

15. A platform lift as defined in claim 14, wherein said control means comprises a servo-valve of the two spool type having two differential inputs; one of said inputs being achieved by said hydraulic motor through the intermediary of at least two demultiplication gears; the other of said inputs being an electric motor; said servo-valve being hydraulically connected to said hydraulic motor.

16. A platform lift as defined in claim 15, wherein said hydraulic motor is provided with a brake means.

17. A platform lift as defined in claim 16, wherein said brake means comprises: one of said first rectangular support members being a fixed plate, adjacent, carrying and overlying said hydraulic motor; a back plate extending parallel to and vertically-spaced above said fixed plate; a plurality of frictional; stator disks interposed between said fixed plate and said back plate; means to immobilize each stator disk; a plurality of frictional rotor disks alternatively sandwiched between said stator disks; means to secure said rotor disks to said output shaft; both said rotor disks and said stator disks being concentrically arranged relative to said output shaft; further comprising a flexible hydraulic conduit extending in a loop between said fixed plate and said back plate; said conduit being fed the hydraulic fluid pressure source of said hydraulic motor; and biasing means to urge said back plate towards said fixed plate.

* * * * *